Jan. 31, 1950   A. M. ANDREWS   2,495,680
APPARATUS FOR JOINING PIECES OF PLASTIC
Filed June 14, 1948   2 Sheets-Sheet 1
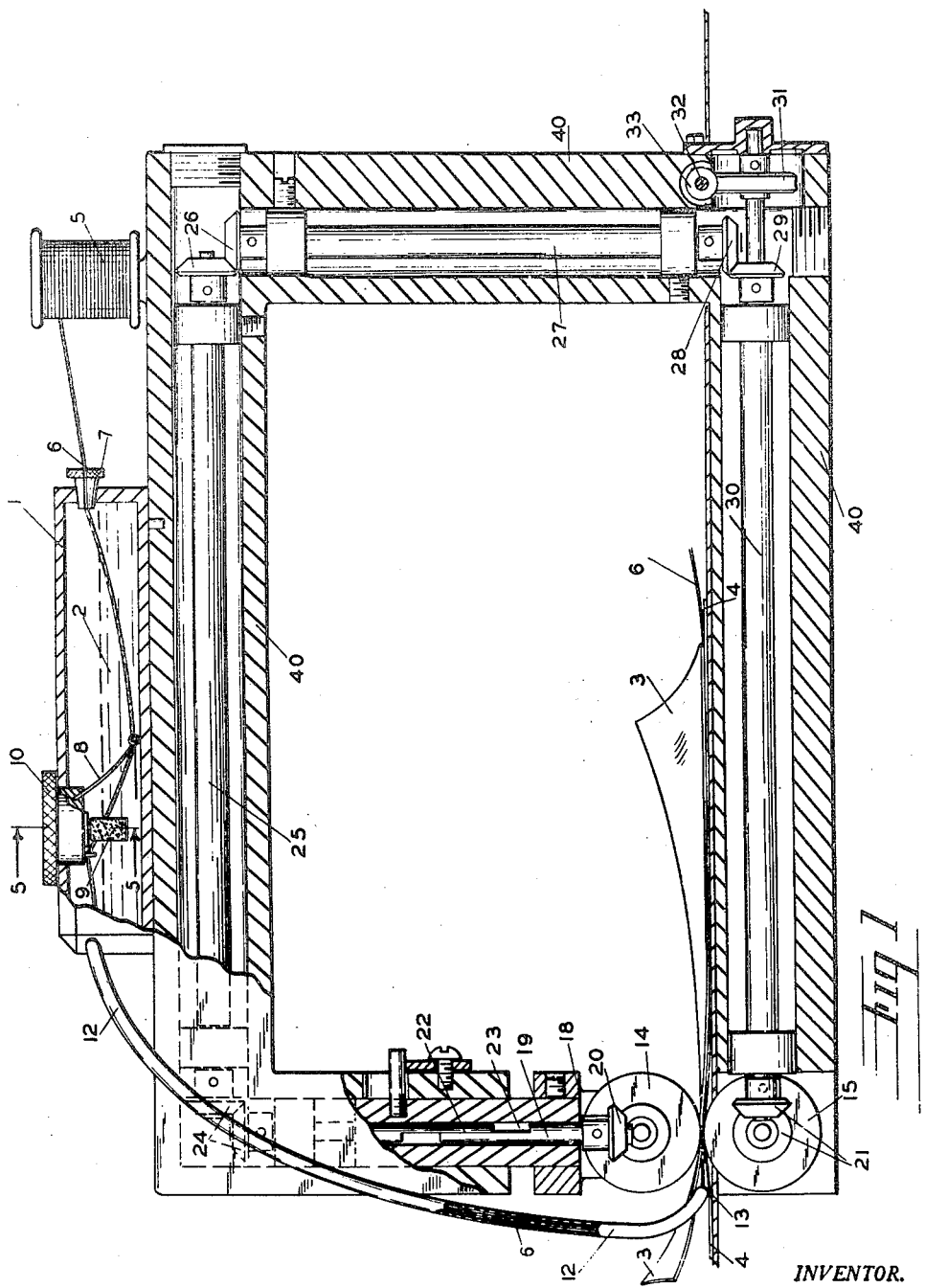
INVENTOR.
ALVADORE M ANDREWS
BY
G. F. McDougall
ATTORNEY

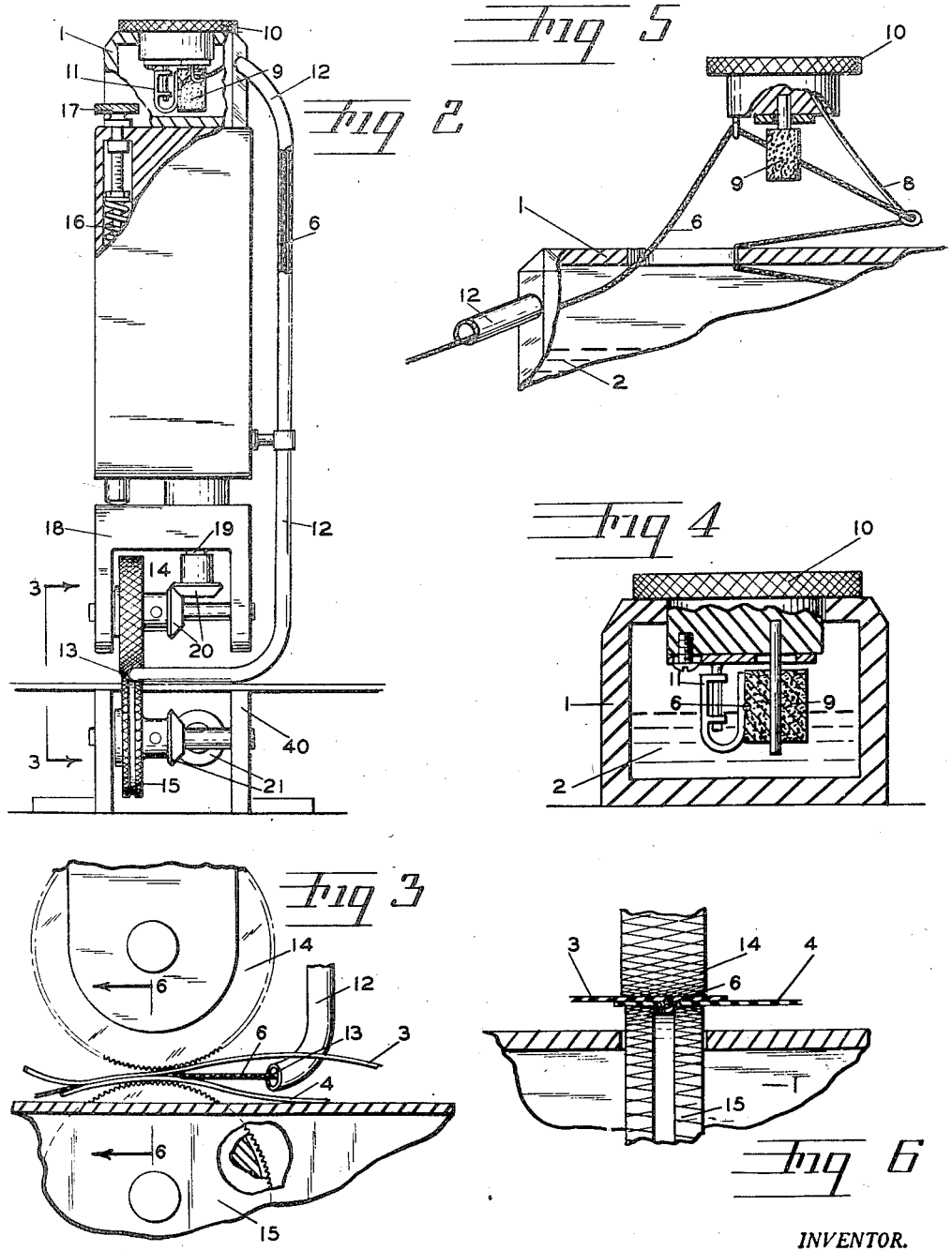

Patented Jan. 31, 1950

2,495,680

UNITED STATES PATENT OFFICE 2,495,680

APPARATUS FOR JOINING PIECES OF PLASTIC

Alvadore M. Andrews, Portland, Oreg.

Original application May 14, 1947, Serial No. 747,960. Divided and this application June 14, 1948, Serial No. 32,780

11 Claims. (Cl. 154—42)

This invention relates to apparatus for joining pieces and parts of vinylite resin, a very flexible plastic, into forms, such as receptacles, garments and for other uses which are very numerous. Trade names, with and without variation of formulae, are numerous. This is a division of my application filed May 14, 1947, Ser. No. 747,960.

The flexible, waterproof plastics of the general class can be joined by electronic heating, but the apparatus is very expensive and the required overlap of the "seams" (a term adopted for use herein for lack of a more descriptive one), is excessive for technical reasons. Other ways of application of heat may also be found operative.

It is an object of the present invention to employ a solvent instead of a cement, applied in such accurately measured quantities, that it does not dissolve its way through sheets being joined; works to produce a straight even seam and results in what may be called a double seam with a very narrow strip of uncemented space between them, the combined seams shortly developing a strength equal to the strength of a sheet of the plastic material without the use of applied heat, though heat will expedite union. The best, and most economical way that I now know of to perform this operation, is by employment of a simple machine, which I will describe and show by illustrations.

Drawings accompany and form a part of this specification, in which:

Fig. 1 is a side elevation of the machine, partly sectioned to display its construction, which will be explained;

Fig. 2 is a left hand end view of the structure shown in Fig. 1;

Fig. 3 is an enlarged view of that part of Fig. 2 indicated by the viewpoint 3—3 in Fig. 2;

Fig. 4 is an enlargement for clarity of the upper part of Fig. 2, referred to hereinafter as the "stripper";

Fig. 5 is an enlargement of a portion of Fig. 1 indicated by the line 5—5 of that figure; and Fig. 6 is a section taken at 6—6 of Fig. 3.

Describing the drawings in greater detail: This machine, as constructed for testing, illustrated in Fig. 1 by elevation, is of the general form of the well known sewing machine, with its work table and arch, but this form was adopted merely as a convenient one and is only one of a very large number of forms that can serve the purpose as well, and it may later be found that another is better.

The essential parts are a reservoir within which is a charge of solvent 2, to be described in detail hereinafter. The solvent 2 is to be applied in minute but continuous amount between two sheets of plastic 3 and 4 in order to bond the sheets 3 and 4 together as strongly as a continuous sheet, bearing in mind that an over-supply can cut through the sheets and that to work satisfactorily, atmosphere must be allowed to come in contact with the solvent for an exceedingly brief interval.

This is accomplished by employing a supply of absorbent thread represented by the spool 5 from which a strand 6 is led through a suitable bushing 7 to the interior of the reservoir 1 and caused to travel through the charge of solvent 2 where it is soaked in solvent, the guide wire 8 being a structure for keeping it submerged.

Since the amount of solvent can be and is gauged by the size of the thread and the amount it will absorb, a stripper felt 9 is supported by the filler plug 10, and a tension spring 11, is positioned adjacent the felt 9, being also supported by the plug 10; the thread 6 is passed between the felt 9 and the spring 11 at a point above the level of solvent in the reservoir and surplus solvent is stripped off, whereupon the thread with its soaked up solvent passes through the tube 12 to a point such as 13, where it passes, almost completely free from atmosphere contact, between the sheets of plastic 3 and 4 to make a seam. It makes the "seam" because as it passes, with the thread, between sheets 3 and 4, the thread with its solvent and the two sheets, 3 and 4, pass between the rollers 14 and 15, the sheets being spring pressed against each other with the thread between them, by the spring 16, the tension of which may be varied by the tension screw 17.

The upper roller 14 is mounted on the carrier 18, is positively driven by the shaft 19 and the bevel gear pair 20. The lower roller 15 will be driven at synchronous speed by the bevel gear pair 21. A shaft 22 which is telescopically made in two parts as shown at 23, Fig. 1, receives power through the bevel gear pair 24, the shaft 25, the bevel gear pair 26, shaft 27, the bevel gear 28, in mesh with gear 29 on shaft 30 driven by the worm wheel 31, operated by the worm 32, the shaft of which, 33, shown in section, will stand for a variable speed motor, not shown as it, with a proper control is entirely conventional, all being mounted on the frame 40. The shafting, gearing and auxiliary parts are also conventional as stated, but are illustrated to show a casual nexus between the drive and the rollers 14 and 15, the latter being grooved so that the thread does not carry all of the pressure, leaving some for the sheets.

The mode of operation is this: As the thread 6 with its carefully metered supply of solvent passes between the sheets of plastic and the whole passes between the rollers 14 and 15, the thread is squeezed practically dry by the pressure transmitted through the roller 14 from the spring 16 and this burden of solvent is about equally spread, laterally, on both sides of the thread and bonds the sheets together in a double seam, spaced apart the width of the thread as flattened. The thread is not bonded to either sheet, as apparently the bond, which in some respects partakes of the nature of a weld at low temperature, requires softening and subsequent congealing of the actual substance of the plastic sheets, hence the thread cannot bond to either one.

The plastic sheet is quite stretchable, somewhat like but less than a like thickness of soft rubber and is much stronger and a sharp pull lengthwise of the seam will break the thread in one or more places, restoring the stretchability in that direction if it is important. If the end of the thread projects beyond the edges of the plastic it can be easily pulled out after breaking. Alternatively, the thread itself may be of plastic of closely related composition that will swell a small amount and at the same time adhere to both sheets when pressed thereagainst; in which case the groove in one of the wheels will be omitted.

I will now describe the plastic material, a commercial product and the solvent, of which a number are available. It is not believed that the employment of solvent to "seam" or bond two sheets together in making useful articles from the type of plastic has been regarded as feasible. The plastic material that I have had the greatest success with is polyvinyl resin, also known by trade names in variety. The solvents that may be used for the named substance may be methyl ethyl ketone plus a small amount of propylene oxide. According to the widely varying substances falling within the broad class of polyvinyl resins, different solvents, within the knowledge of chemical art may be used.

In the foregoing specification the word plastic is employed as a definition of any of the substances amenable to treatment and susceptible to what may be called chemical welding by a measured amount of solvent with concurrent application of pressure.

It is also of advantage to dissolve a small amount of the polyvinyl alcohol plastic material itself in the solvent since such a combination makes a fuller seam without impairing the speed of operation; in fact it is thought to accelerate setting. Other plastics that are available may be varieties of the following: Polyvinyl or vinyl resins or plastics include polyvinyl alcohol, polyvinyl acetate, polyvinyl chloride, preferably vinyl chloride-vinyl acetate copolymer ("vinylite") and the like. Solvents for these resins are numerous and well known to those skilled in the art, but examples include acetone, mesityl oxide, methyl isobutyl ketone, propylene oxide, methyl n-amyl ketone, cyclic ketones and the like, the solvent activity varying somewhat according to the resin, the brand of resin and grade, and such physical conditions as the temperature.

Having disclosed my invention so that those familiar with the synthetic plastic arts can make use of its teaching, what I claim as new and desire to secure by Letters Patent, is:

1. A machine for bonding together sheets of plastic that are amenable to solvents, by interposing a solvent carrying thread between the sheets and applying pressure, comprising a solvent storage reservoir, a thread holder adjacent thereto, means for drawing a thread through said reservoir to cause the thread to absorb solvent, a conduit for conducting the solvent charged thread to a point where it is passed between sheets to be joined, protecting said thread from atmosphere contact while being conducted, and means for applying pressure to plastic sheets and the solvent carrying thread concurrently.

2. A bonding machine as claimed in claim 1 that includes a stripper for stripping off excess solvent from the thread just prior to its leaving the reservoir.

3. A bonding machine for bonding pieces of plastic together by a lap weld, comprising a pair of rollers, one being superposed on the other and pressed thereagainst, means for producing synchronous contact revolution of said rollers, a solvent reservoir adjacent said rollers, a thread support adjacent said reservoir, guide means for guiding a thread strand from said support, through said reservoir to pick up solvent and guide said thread to a point immediately adjacent the said rollers in such aspect thereto that it can be fed continuously between two sheets of plastic while said sheets are fed concurrently between said rollers.

4. A machine for bonding solvent responsive sheets together by a progressively applied seam-like bond, comprising a pair of rollers, means for causing synchronous revolution thereof, a solvent reservoir, means for passing a thread through solvent therein to absorb a limited supply of solvent, means for conducting the thread with its solvent to the point where it is fed between the sheets of plastic, and pressure applying means in cooperation with said rollers to express solvent from the thread as the sheets pass between them, to soften the material of the plastic sheets, concurrently pressing them together.

5. A machine for joining two sheets of solvent amenable plastic together by softening their surfaces by solvent and immediately pressing the softened surfaces together, comprising a pair of rollers, loading means therefor, means for synchronously revolving said rollers, a solvent reservoir, a thread outlet tube leading from said reservoir to a point close to said rollers on their intake contact, and a thread supply holder so positioned that a thread therefrom can pass through solvent within the reservoir, pass out through said tube and between the sheets of plastic with its burden of solvent by the forward feeding of said sheets between said rollers.

6. The combination as claimed in claim 4 and including a stripper for the thread to limit the amount of solvent carried thereby.

7. The combination as claimed in claim 5 and including a means such as a groove in one of the rollers to put surface areas of the plastic sheets under pressure on both sides of the solvent carrying thread.

8. A joining machine for plastic sheets, that are amenable to solvent, by producing a weld like adhesion, comprising a pair of cooperating rollers between which sheets of plastic are fed, means for synchronously turning the rollers to draw the sheets between them, means for supporting a thread supply, a solvent reservoir through which thread from said thread supply supporting means can be drawn to absorb solvent therefrom, a tube leading from said reservoir to a point immediately behind the intake contact of said rollers, whereby when a thread is passed from said reservoir, through said tube, with a burden of solvent, with its free end between said sheets of plastic, a weld like seam will be constructed by softening the adjacent surfaces of the sheets and concurrently pressing them together.

9. In a machine for bonding together sheets of material comprising a liquid storage reservoir, a thread holder adjacent thereto, means for drawing a thread through said reservoir to cause the thread to absorb liquid, a conduit for conducting the liquid charged thread to a point where it is passed between sheets to be joined, protecting said thread from atmosphere contact while being conducted, and means for applying pressure to sheets and the liquid carrying thread concurrently.

10. In a machine for bonding together sheets of material, said machine comprising a liquid storage reservoir, a thread holder, means for guiding a thread through said reservoir to cause said thread to absorb liquid, conduit means for conducting the liquid charged thread to a point where it is passed between sheets to be joined together, said conduit protecting said thread from atmosphere while being conducted, and cooperating pressure means adapted for receiving and carrying therebetween a pair of sheets with the liquid charged thread interposed between said sheets and for drawing said thread through said reservoir.

11. A machine for use in joining together sheets of material comprising a pair of cooperating pressure applying elements adapted to receive and carry therebetween a pair of sheets of material to be joined together, a reservoir adapted for containing a quantity of liquid useful in joining said sheets, a thread holder, means for guiding thread from said holder through said reservoir to cause it to absorb liquid therefrom, conduit means for guiding the thread from said reservoir to a point immediately adjacent said pressure applying elements, means supporting one of said pressure applying elements for movement toward and away from the other of said elements, and resilient pressure means urging said one element toward the other element.

ALVADORE M. ANDREWS.

REFERENCES CITED

The following references are of record in the file of this patent:

UNITED STATES PATENTS

| Number | Name | Date |
| --- | --- | --- |
| 2,117,452 | Robinson | May 17, 1938 |
| 2,335,159 | Salfisberg | Nov. 23, 1943 |
| 2,343,975 | Hosfield | Mar. 14, 1944 |
| 2,364,903 | Howard | Dec. 12, 1944 |
| 2,384,462 | Goodman | Sept. 11, 1945 |